(12) United States Patent
Yano et al.

(10) Patent No.: US 7,775,933 B2
(45) Date of Patent: Aug. 17, 2010

(54) CONTROL APPARATUS AND CONTROL METHOD FOR TORQUE TRANSMISSION MECHANISM

(75) Inventors: Masaya Yano, Anjo (JP); Satoshi Munakata, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 461 days.

(21) Appl. No.: 11/892,625

(22) Filed: Aug. 24, 2007

(65) Prior Publication Data

US 2008/0081732 A1    Apr. 3, 2008

(30) Foreign Application Priority Data

Sep. 29, 2006   (JP)   ............... 2006-266641

(51) Int. Cl.
*F16H 59/64* (2006.01)
*G06F 7/00* (2006.01)

(52) U.S. Cl. .......................................... 477/98; 701/65

(58) Field of Classification Search .................. 477/34, 477/76, 98, 904; 701/58, 60, 65
See application file for complete search history.

(56) References Cited

U.S. PATENT DOCUMENTS

| 5,261,295 | A | * | 11/1993 | Iwanaga et al. | ............... 477/98 |
| 5,518,468 | A | * | 5/1996 | Sametz et al. | ............... 477/156 |
| 7,553,255 | B2 | * | 6/2009 | Torres et al. | .................. 477/35 |
| 7,553,257 | B2 | * | 6/2009 | Shigeta et al. | ................ 477/98 |
| 7,594,560 | B2 | * | 9/2009 | Homan et al. | ............... 180/233 |
| 2006/0293145 | A1 | * | 12/2006 | Lanker | ........................ 477/34 |

FOREIGN PATENT DOCUMENTS

| JP | A-64-090824 | 4/1989 |
| JP | A-05-272555 | 10/1993 |
| JP | A-2004-322702 | 11/2004 |

* cited by examiner

*Primary Examiner*—Roger Pang
(74) *Attorney, Agent, or Firm*—Oliff & Berridge, PLC

(57) ABSTRACT

An ECU executes a program including the step of controlling the current value of an actuator that moves a sleeve by increasing the current value subsequent to complete synchronization between a rear output shaft and a front output shaft of a transfer when the oil temperature of a front differential connected to the front output shaft of the transfer via a front propeller shaft is low to switch from a two-wheel drive state to a four-wheel drive state. The rear output shaft and front output shaft are brought into synchronization by a synchronizer abutting against the sleeve.

12 Claims, 9 Drawing Sheets

F I G. 9
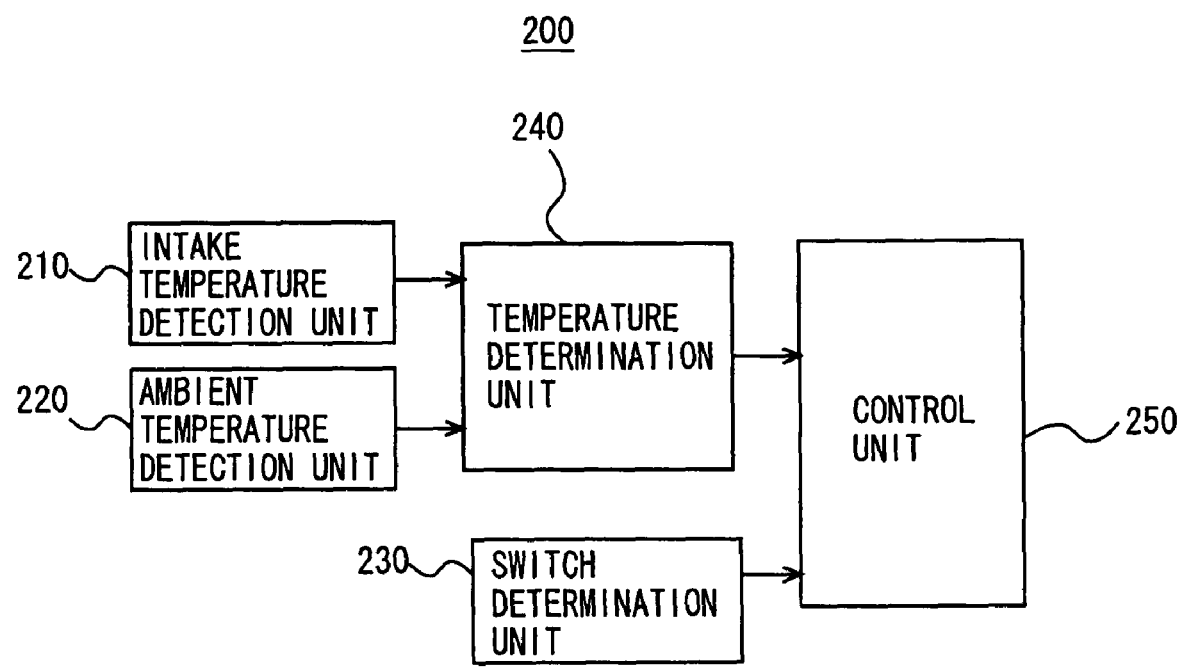

CONTROL APPARATUS AND CONTROL METHOD FOR TORQUE TRANSMISSION MECHANISM

This nonprovisional application is based on Japanese Patent Application No. 2006-266641 filed with the Japan Patent Office on Sep. 29, 2006, the entire contents of which are hereby incorporated by reference.

BACKGROUND OF THE INVENTION

1. Field of the Invention

The present invention relates to the control technique for a torque transmission mechanism, particularly the control technique for a torque transmission mechanism including a synchronizer member to synchronize a first rotational shaft and a second rotational shaft.

2. Description of the Background Art

A vehicle incorporating a transfer capable of switching between a two-wheel drive mode and a four-wheel drive mode is conventionally known. Some of such vehicles are further capable of switching between a high speed running mode and a low speed running mode in the four-wheel drive mode. When the drive mode is switched, the shafts differing in revolution speed are set to the same revolution speed. In other words, torque is required to set the shafts differing in revolution speed to the same revolution speed when the drive mode is to be switched. The torque required for switching the drive mode varies by the friction torque of the transmission coupled to, for example, the transfer. There is proposed the technique of controlling the actuator of the transfer such that torque corresponding to the friction torque of the transmission is output.

Japanese Patent Laying-Open No. 2004-322702 discloses a drive mode switching control apparatus for a transfer, including a transfer disposed at a position between an automatic transmission and a wheel, having a high gear/low gear switching mechanism that allows switching between a high mode position by a high gear ratio and a low mode position by a low gear ratio, and a drive mode switching control unit providing a switch actuation command of the drive mode position to a shift actuator when a predetermined switching condition including the condition that the automatic transmission takes the neutral range position is met at the time of switching the drive mode in response to an operation by the driver. This drive mode switching control apparatus includes a friction torque estimation unit to estimate the friction torque when the automatic transmission is at the neutral range position. The drive mode switching control unit sets the switch actuation torque designated to the shift actuator by the variable torque corresponding to the estimated friction torque at the time of switching between the high mode position and low mode position.

The drive mode switching control apparatus disclosed in the aforementioned publication can ensure a reliable switching operation and improve the fuel efficiency by reducing the energy consumption at the shift actuator, independent of the level of the friction torque of the automatic transmission, by virtue of setting the switch actuation torque designated to the shift actuator in accordance with the variable torque corresponding to the estimated friction torque.

In the case where the actuator is controlled such that torque corresponding to the friction torque is output as in the drive mode switching control apparatus disclosed in Japanese Patent Laying-Open No. 2004-322702, the actuator is controlled such that more torque is output in proportion to higher friction torque. In this case, the pressure acting on the synchronizer that synchronizes the rear output shaft and the front output shaft, for example, of the transfer through the frictional force is increased. This may accelerate the wear of the synchronizer and the like.

SUMMARY OF THE INVENTION

An object of the present invention is to provide a control apparatus and method for a torque transmission mechanism that can suppress acceleration of wear.

A control apparatus for a torque transmission mechanism according to an aspect of the present invention includes a first rotational shaft transmitting torque to a first wheel, a second rotational shaft transmitting torque to a second wheel, a movable member moved by an actuator for achieving one of a state where the first rotational shaft and second rotational shaft are connected and a state where the first rotational shaft and second rotational shaft are disconnected, and a synchronizer member synchronizing the first rotational shaft and second rotational shaft by abutting against the movable member before the movable member connects the first rotational shaft and second rotational shaft. The control apparatus includes a sensor detecting a value related to torque acting on the second rotational shaft, and a control unit. The control unit effects control such that the output of the actuator is increased when the torque acting on the second rotational shaft is high as compared to the case where the torque is low by increasing the output of the actuator subsequent to complete synchronization between the first rotational shaft and the second rotational shaft through the synchronizer member.

According to the configuration set forth above, a value related to torque acting on the second rotational shaft of the torque transmission mechanism is detected. The value such as intake temperature, ambient temperature, oil temperature, or the like, related to the torque acting on the second rotational shaft of the torque transmission mechanism by lubricating oil is detected. By increasing the output of the actuator subsequent to complete synchronization between the first rotational shaft and second rotational shaft through the synchronizer member, the output of the actuator is increased when the torque acting on the second rotational shaft is high as compared to the case where the torque is low. Accordingly, the output of the actuator is maintained at the same level independent of the torque acting on the second rotational shaft before complete synchronization between the first and second rotational shafts is established, and the output of the actuator is increased when the torque acting on the second rotational shaft is high as compared to the case where the torque is low, only after complete synchronization is established. Thus, increase of the pressure acting on the synchronizer member can be suppressed when the synchronizer member is to set the revolution speed of the first rotational shaft in synchronization with the revolution speed of the second rotational shaft. As a result, there can be provided a control apparatus for a torque transmission mechanism that can suppress acceleration of wear of the synchronizer member.

Preferably, the value related to torque includes the temperature. The control unit effects control such that the output of the actuator is increased when the detected temperature is lower than a threshold value as compared to the case where the detected temperature is high to increase output of the actuator in the case where the torque acting on the second rotational shaft is high as compared to the case where the torque is low.

In accordance with this configuration, the output of the actuator is increased when the detected temperature is lower than a threshold value as compared to the case where the detected temperature is high since the torque acting on the second rotational shaft becomes higher when the temperature is low due to the higher viscosity of the lubricating oil. Thus, connection between the first rotational shaft and second rotational shaft can be ensured.

A control apparatus for a torque transmission mechanism according to another aspect of the present invention includes a first rotational shaft transmitting torque to a first wheel, a second rotational shaft transmitting torque to a second wheel, a movable member moved by an actuator to attain one of a state where the first rotational shaft and the second rotational shaft is connected and a state where the first rotational shaft and the second rotational shaft is disconnected, and a synchronizer member synchronizing the first rotational shaft and the second rotational shaft by abutting against the movable member before the movable member connects the first rotational shaft and the second rotational shaft. The control apparatus includes a sensor detecting a value related to torque acting on the second rotational shaft, and a control unit. The control unit effects control such that the output of the actuator is increased when the torque acting on the second rotational shaft is high as compared to the case where the torque is low by increasing the output of the actuator by a first value before complete synchronization between the first rotational shaft and the second rotational shaft is established through the synchronizer member, and by increasing the output of the actuator by a second value that is larger than the first value, subsequent to complete synchronization between the first rotational shaft and the second rotational shaft through the synchronizer member.

According to this configuration, a value related to torque acting on the second rotational shaft of the torque transmission mechanism is detected. A value such as intake temperature, ambient temperature, oil temperature, or the like, related to the torque acting on the second rotational shaft of the torque transmission mechanism by lubricating oil is detected. By increasing the output of the actuator by the first value before complete synchronization between the first rotational shaft and the second rotational shaft through the synchronizer member and by the second value larger than the first value subsequent to complete synchronization, the output of the actuator is increased when the torque acting on the second rotational shaft is high as compared to the case where the torque is small. Accordingly, the increase in the output of the actuator can be reduced prior to complete synchronization between the first rotational shaft and the second rotational shaft as compared to that subsequent to complete synchronization. Therefore, increase of the pressure acting on the synchronizer member when the synchronizer member is to set the revolution speed of the first rotational shaft in synchronization with the revolution speed of the second rotational shaft can be suppressed. As a result, there can be provided a control apparatus for a torque transmission mechanism that can suppress acceleration of the wear of the synchronizer member.

Preferably, the value related to torque includes the temperature. The control unit effects control such that the output of the actuator is increased when the detected temperature is lower than a threshold value as compared to the case where the detected temperature is high to increase output of the actuator in the case where the torque acting on the second rotational shaft is high as compared to the case where the torque is low.

In accordance with this configuration, the output of the actuator is increased when the detected temperature is lower than a threshold value as compared to the case where the detected temperature is high since the torque acting on the second rotational shaft becomes higher when the temperature is low due to the higher viscosity of the lubricating oil. Thus, connection between the first rotational shaft and second rotational shaft can be ensured.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a first functional block diagram of an ECU.

DESCRIPTION OF THE PREFERRED EMBODIMENTS

Figure 1:
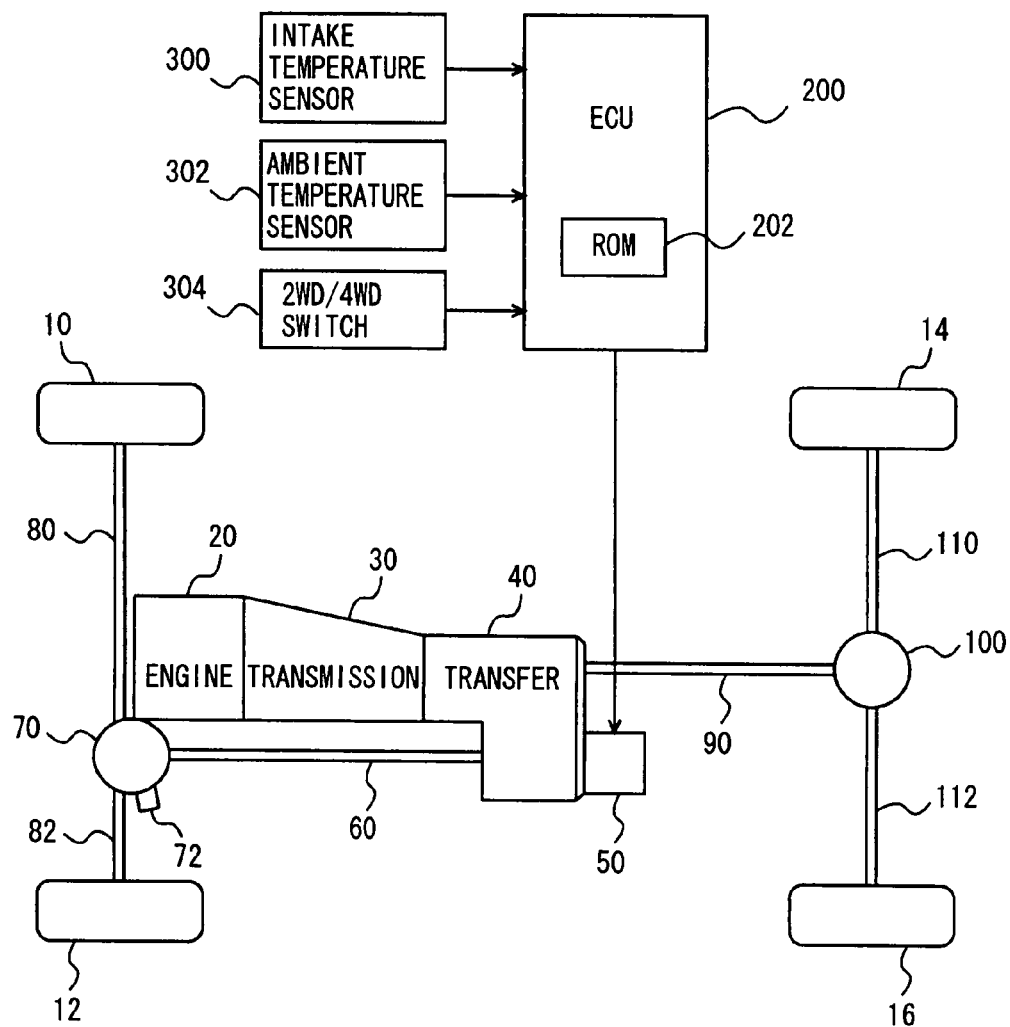
FIG. 1 is a block diagram of a configuration of a vehicle incorporating a control apparatus according to an embodiment of the present invention.

Embodiments of the present invention will be described hereinafter with reference to the drawings. In the following description, the same components have the same reference characters allotted, and their designation and function are also identical. Therefore, detailed description thereof will not be repeated.

First Embodiment

A vehicle incorporating a control apparatus according to the present embodiment will be described with reference to FIG. 1. The vehicle includes front wheels 10 and 12, rear wheels 14 and 16, an engine 20, a transmission 30, and a transfer 40. The control apparatus for a torque transmission mechanism according to the present embodiment is realized by execution of a program stored in a ROM (Read Only Memory) 202 of an ECU (Electronic Control Unit) 200, for example.

Transfer 40 functions to output, from the power transmission system of the drive scheme (rear wheel drive in FIG. 1) qualified as the base, the torque to be transmitted to a wheel (front wheel side in FIG. 1) that was not essentially a drive wheel. The vehicle further includes an actuator 50, a front propeller shaft 60, a front differential 70, and front drive shafts 80 and 82.

The vehicle further includes a rear propeller shaft 90, a rear differential 100, and rear drive shafts 110 and 112.

Actuator 50 is, for example, an electric motor. A shift fork moves according to the rotation of the motor. By the movement of the sleeve sandwiched by the shift fork, switching between a two-wheel drive state and four-wheel drive state is conducted.

In a two-wheel drive state, transfer 40 transmits the torque from transmission 30 to rear propeller shaft 90 alone, and not to front propeller shaft 60.

In a four-wheel drive state, transfer 40 transfers the torque transmitted from transmission 30 to both rear propeller shaft 90 and front propeller shaft 60.

Front differential 70 of the present embodiment is provided with an ADD (Automatic Disconnecting Differential) mechanism 72. ADD mechanism 72 frees and locks front differential 70 in a two-wheel drive state and a four-wheel drive state, respectively.

When front differential 70 is free, transmission of torque from front propeller shaft 60 to front drive shafts 80 and 82 is cut off. Under this state, front propeller shaft 60 can stop during the running of the vehicle.

When front differential 70 is locked, a difference in the revolution speed between the left and right wheels, if any, is allowed, and torque is transmitted from front propeller shaft 60 towards front drive shafts 80 and 82 in the event of the same revolution speed for the left and right wheels. Under this state, front propeller shaft 60 rotates during the running of the vehicle.

The vehicle further includes an intake temperature sensor 300 detecting the temperature of air introduced into engine 20 (hereinafter, also termed "intake temperature"), an ambient temperature sensor 302 detecting the temperature outside the vehicle (hereinafter, also termed "ambient temperature"), a 2WD/4WD switch 304 to input switching designation between a two-wheel drive state and a four-wheel drive state, and an ECU 200 to control actuator 50 according to the detected values from respective sensors and the setting of respective switches.

Figure 2:
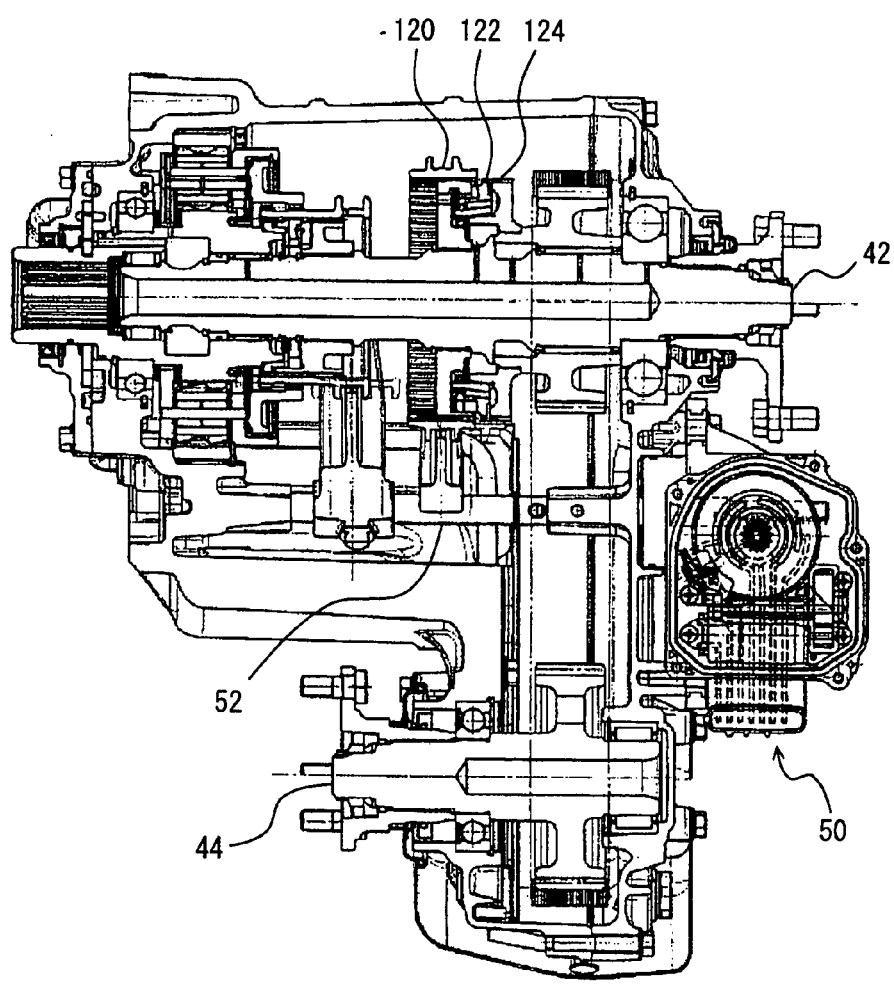
FIG. 2 represents a transfer.

Transfer 40 will be described hereinafter with reference to FIG. 2. Transfer 40 includes a rear output shaft 42 connected to rear propeller shaft 90, and a front output shaft 44 connected to front propeller shaft 60

Rear output shaft 42 constantly receives the torque from transmission 30. Front output shaft 44 receives the torque only when in a four-wheel drive state.

Transfer 40 further includes a sleeve 120 connected to rear output shaft 42, a synchronizer 122 bringing rear output shaft 42 and front output shaft 44 in synchronization by a frictional force, and a gear piece 124 connected to front output shaft 44 via a chain. Front output shaft 44 may be connected to sleeve 120, and rear output shaft 42 may be connected to gear piece 124.

Figure 3:
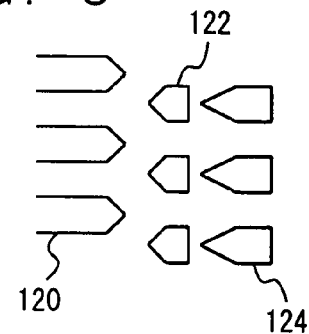
FIG. 3 represents a sleeve, synchronizer, and gear piece in a two-wheel drive state.

Sleeve 120 is moved by actuator 50 via shift fork 52. As shown in FIG. 3, the vehicle takes a two-wheel drive state when sleeve 120 is located apart from gear piece 124.

Figure 4:
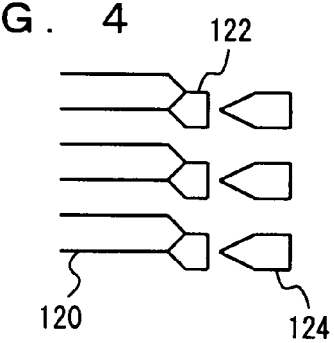
FIG. 4 represents a sleeve, synchronizer, and gear piece under a state where a rear output shaft is in synchronization with a front output shaft.

By moving sleeve 120 so as to abut against the chamfer of synchronizer 122, as shown in FIG. 4, pressure is applied to synchronizer 122. Accordingly, a frictional force acts on synchronizer 122, whereby rear output shaft 42 and front output shaft 44 are brought into synchronization.

Figure 5:
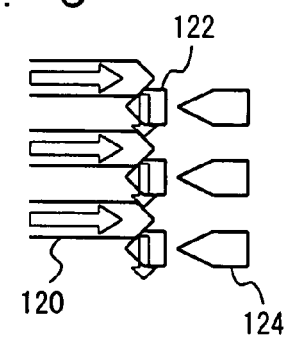
FIG. 5 represents a sleeve, synchronizer, and gear piece under a state where the synchronizer is thrust by the sleeve.

Upon complete synchronization between rear output shaft 42 and front output shaft 44, sleeve 120 is further moved, as shown in FIG. 5, in order to achieve engagement between sleeve 120 and gear piece 124. As a result, synchronizer 122 is thrust by sleeve 120 (synchronizer 122 is moved in a turning manner).

Figure 6:
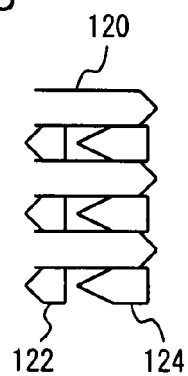
FIG. 6 represents a sleeve, synchronizer, and gear piece under a state where the sleeve engages with the gear piece.

At this stage, synchronizer 122 is thrust by the rotation of front output shaft 44, i.e. front propeller shaft 60. Switching from the two-wheel drive state to the four-wheel drive state is accomplished when the state of complete engagement between sleeve 120 and gear piece 124 is achieved, as shown in FIG. 6.

It is to be noted that front propeller shaft 60 is rotated during the thrusting step of synchronizer 122 by the movement of sleeve 120 for engagement between sleeve 120 and gear piece 124, subsequent to complete synchronization between rear output shaft 42 and front output shaft 44.

Therefore, a torque greater than the friction torque acting on front propeller shaft 60 and the like must be applied to synchronizer 122 during the thrusting step of synchronizer 122 by sleeve 120.

Figure 7:
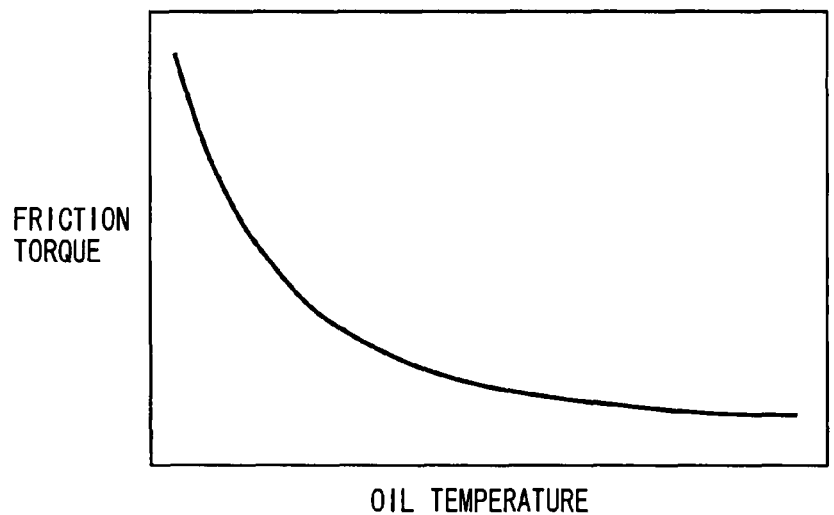
FIG. 7 represents friction torque acting on a front propeller shaft.

The friction torque acting on front propeller shaft 60 and the like varies depending upon the temperature of the lubricating oil (oil temperature) of front differential 70. As shown in FIG. 7, the friction torque becomes higher as the oil temperature is lower. Therefore, the current value of actuator 50, i.e. the output actuator 50, must be increased in proportion to a lower oil temperature.

However, if the current value of actuator 50 is constantly increased when switching from the two-wheel drive state to the four-wheel drive state, the pressure acting on synchronizer 122 will become greater to accelerate the wear of synchronizer 122.

Figure 8:
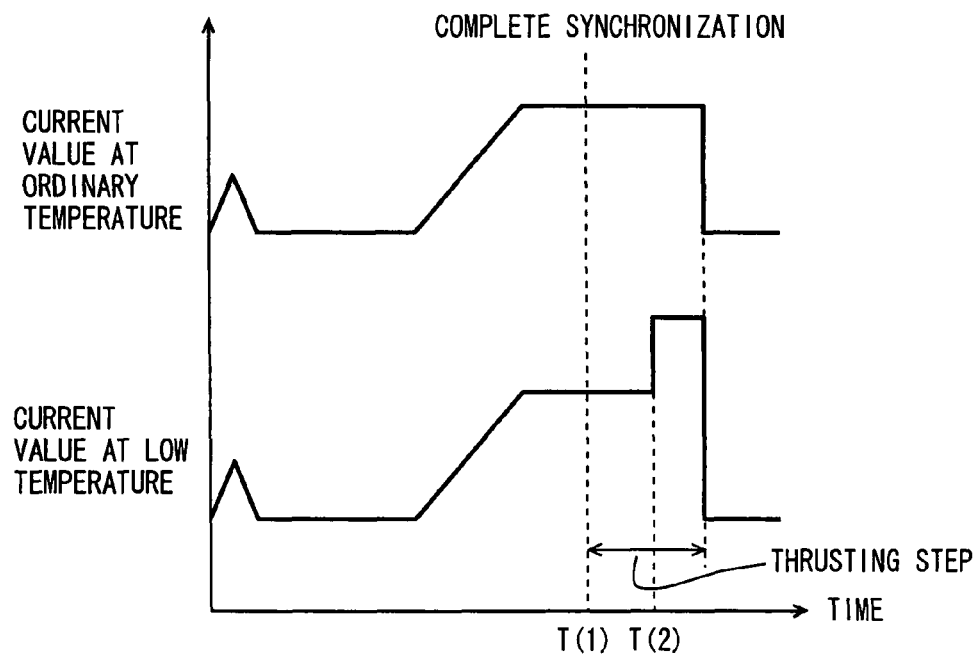
FIG. 8 is a first diagram of the current value of an actuator.

In the present embodiment, the current value of actuator 50 is set identical for both the ordinary temperature state and low temperature state before complete synchronization between rear output shaft 42 and front output shaft 44 is achieved at time T (1), as shown in FIG. 8.

When the temperature is low, the current value is set higher than that of the ordinary temperature state at time T (2), subsequent to complete synchronization between rear output shaft 42 and front output shaft 44. In other words, control is effected such that the current value is set higher in a low temperature state than in an ordinary temperature state only during the thrusting step of synchronizer 122 by sleeve 120. When in an ordinary temperature state, control is effected such that the current value is not increased subsequent to complete synchronization between rear output shaft 42 and front output shaft 44.

ECU 200 will be described in further detail with reference to FIG. 9. The function of ECU 200 described hereinafter can be realized by software or by hardware.

ECU 200 includes an intake temperature detection unit 210, an ambient temperature detection unit 220, a switch determination unit 230, a temperature determination unit 240, and a control unit 250.

Intake temperature detection unit 210 detects the intake temperature based on a signal transmitted from intake temperature sensor 300. Ambient temperature detection unit 220 detects the ambient temperature based on a signal transmitted from ambient temperature sensor 302.

Switch determination unit 230 determines whether to switch from the two-wheel drive state to the four-wheel drive state, or from the four-wheel drive state to the two-wheel drive state, based on a signal transmitted from 2WD/4WD switch 304.

Temperature determination unit 240 determines whether the oil temperature of front differential 70 corresponds to the ordinary temperature or low temperature based on the intake temperature and ambient temperature. For example, when at least one of the intake temperature and ambient temperature is lower than the threshold value, determination is made that the oil temperature of front differential 70 is low. Determination of whether the oil temperature of front differential 70 corresponds to the ordinary temperature or low temperature is not limited to the scheme set forth above. The oil temperature of front differential 70 may be detected directly.

Control unit 250 controls the current value, i.e. output, of actuator 50. Control unit 250 effects control such that the current value of actuator 50 is higher than that of ordinary temperature when in a low temperature state in the thrusting step of synchronizer 122 by sleeve 120, by increasing the current value of actuator 50 subsequent to complete synchronization between rear output shaft 42 and front out shaft 44, as set forth above.

Figure 10:
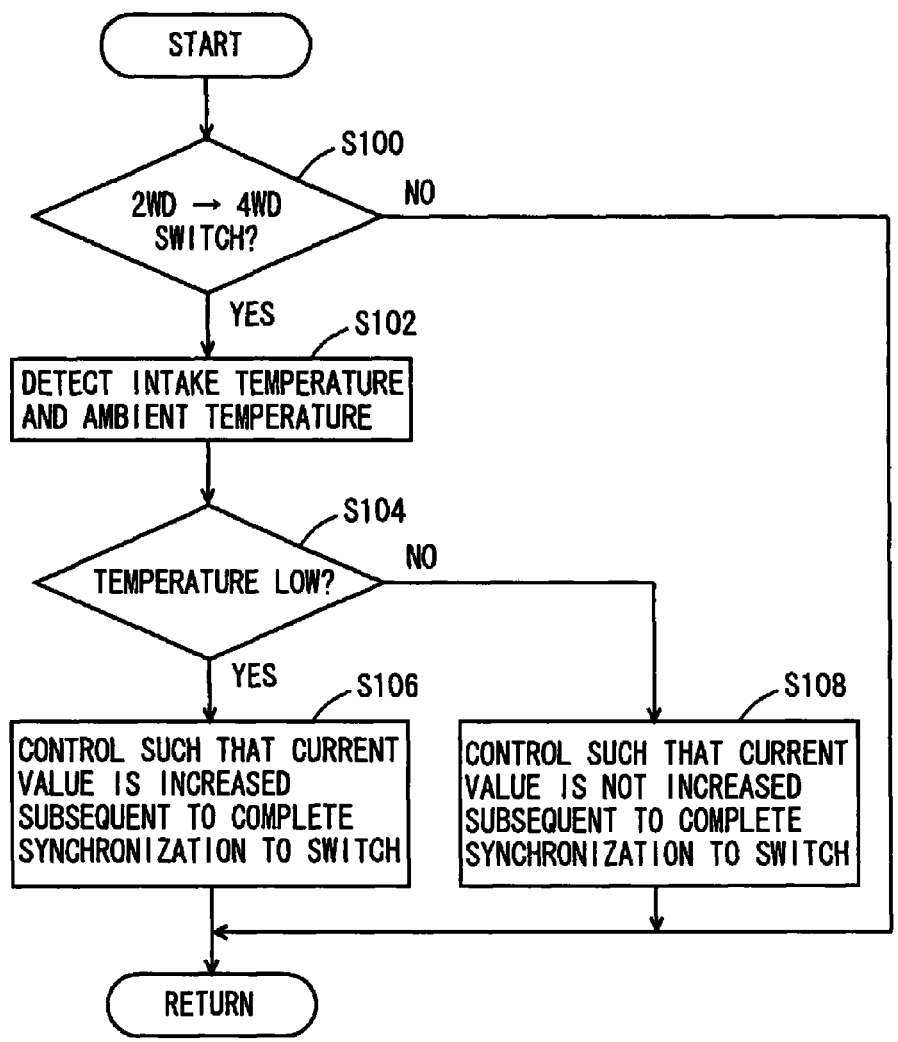
FIG. 10 is a first flowchart of a control configuration of a program executed by the ECU.

The control configuration of the program executed by ECU 200 qualified as the control apparatus of the present embodiment will be described hereinafter with reference to FIG. 10. The program set forth below is repeatedly executed in a predetermined cycle.

At step (hereinafter, step abbreviated as S) 100, ECU 200 determines whether to switch from the two-wheel drive state to the four-wheel drive state or not based on a signal transmitted from 2WD/4WD switch 304. When determination is made to switch from the two-wheel drive state to the four-wheel drive state (YES at S100), control proceeds to S102, otherwise (NO at S100), this process ends.

At S102, ECU 200 detects the intake temperature and the ambient temperature based on a signal transmitted from intake temperature sensor 300 and ambient temperature sensor 302, respectively.

At step S104, ECU 200 determines whether the oil temperature of front differential 70 is low or not based on the intake temperature and ambient temperature. When the oil temperature of front differential 70 is low (YES at S104), control proceeds to S106, otherwise (NO at S104), control proceeds to S108.

At S106, ECU 200 controls the current value of actuator 50 to be increased, subsequent to complete synchronization between rear output shaft 42 and front output shaft 44 to switch from the two-wheel drive state to the four-wheel drive state.

At S108, ECU 200 controls actuator 50 such that the current value is not increased subsequent to complete synchronization between rear output shaft 42 and front output shaft 44 to switch from the two-wheel drive state to the four-wheel drive state.

The operation of ECU 200 qualified as the control apparatus of the present embodiment based on the configuration and flowchart set forth above will be described hereinafter.

When determination is made of switching from the two-wheel drive state to the four-wheel drive state in response to the driver operating 2WD/4WD switch 304 during the running of the vehicle (YES at S100), the intake temperature and ambient temperature are detected based on a signal transmitted from intake temperature sensor 300 and ambient temperature sensor 302, respectively (S102).

Figure 11:
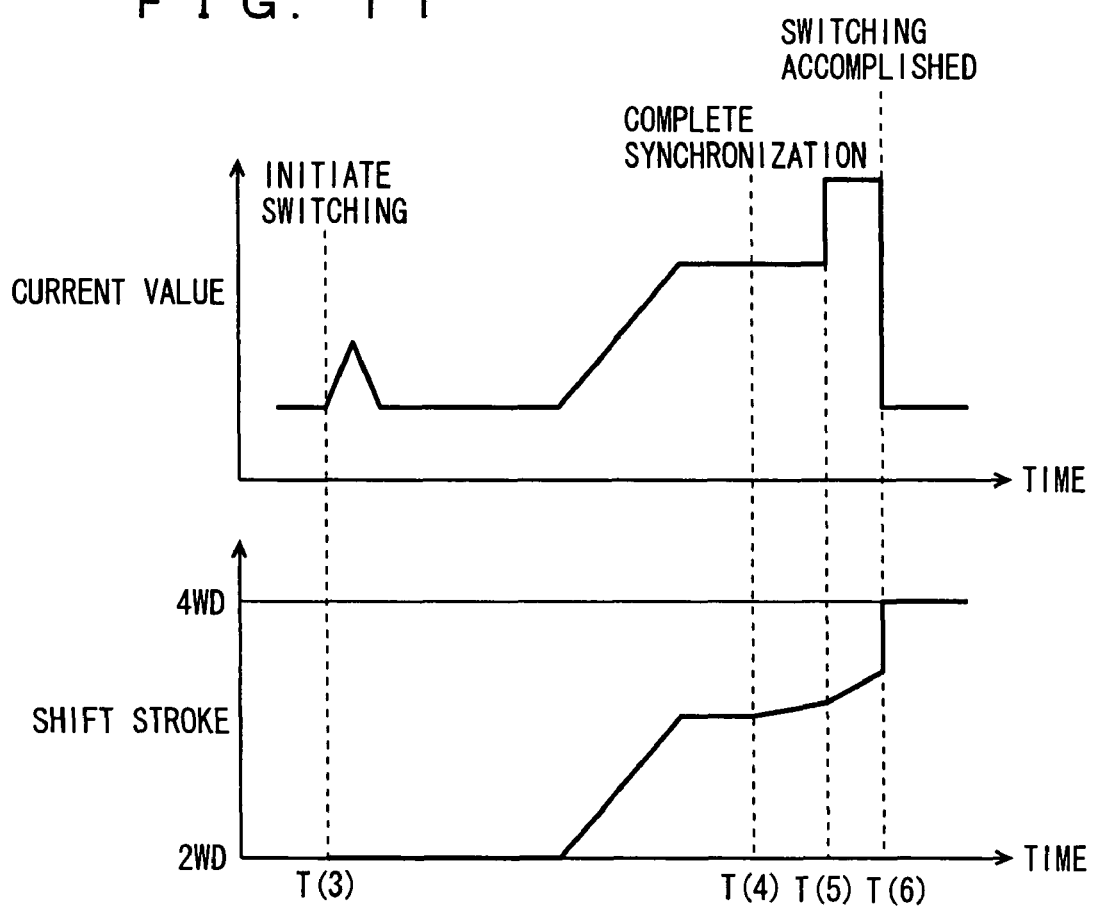
FIG. 11 represents the current value and the shift stroke of the actuator.

Determination is made whether the oil temperature of front differential 70 is low or not based on these intake temperature and ambient temperature (S104). When the oil temperature of front differential 70 is low (YES at S104), switching from the two-wheel drive state to the four-wheel drive state is initiated at time T (3), as shown in FIG. 11. Subsequent to complete synchronization between rear output shaft 42 and front output shaft 44 at time T (4), actuator 50 is controlled such that the current value is increased at time T (5) to switch from the two-wheel drive state to the four-wheel drive state (S106).

Thus, synchronizer 122 is reliably thrust to establish engagement between sleeve 120 and gear piece 124 even if the friction torque acting on front propeller shaft 60 is high. Switching from the two-wheel drive state to the four-wheel drive state is accomplished at time T (6).

When the oil temperature of front differential 70 is not low (YES at S104), i.e. corresponds to ordinary temperature, actuator 50 is controlled such that the current value is not increased subsequent to complete synchronization between rear output shaft 42 and front output shaft 44 to switch from the two-wheel drive state to the four-wheel drive state (S108).

In the case where the oil temperature of the front differential is low, the ECU qualified as the control apparatus of the present embodiment controls the actuator such that the current value is increased subsequent to complete synchronization between the rear output shaft and the front output shaft to switch from the two-wheel drive state to the four-wheel drive state. Accordingly, the output of the actuator is maintained at the same level independent of the oil temperature, i.e. the torque acting on the front propeller shaft before complete synchronization between the rear output shaft and the front output shaft is established, and the output of the actuator is increased when the friction torque acting on the front propeller shaft is high as compared to the case where the friction torque is low, only after complete synchronization is established. Thus, increase of the pressure acting on the synchronizer can be suppressed when the synchronizer is to bring the rear output shaft and the front output shaft in synchronization. As a result, acceleration of the wear of the synchronizer can be suppressed Second Embodiment A second embodiment of the present invention will be described hereinafter. The present embodiment differs from the first embodiment set forth above in that the current value of actuator 50 is increased when the temperature is low than when at the ordinary temperature before and after complete synchronization between rear output shaft 42 and front output shaft 44 is established. The remaining configuration is identical to that of the first embodiment. Therefore, details of the description thereof will not be repeated.

Figure 12:
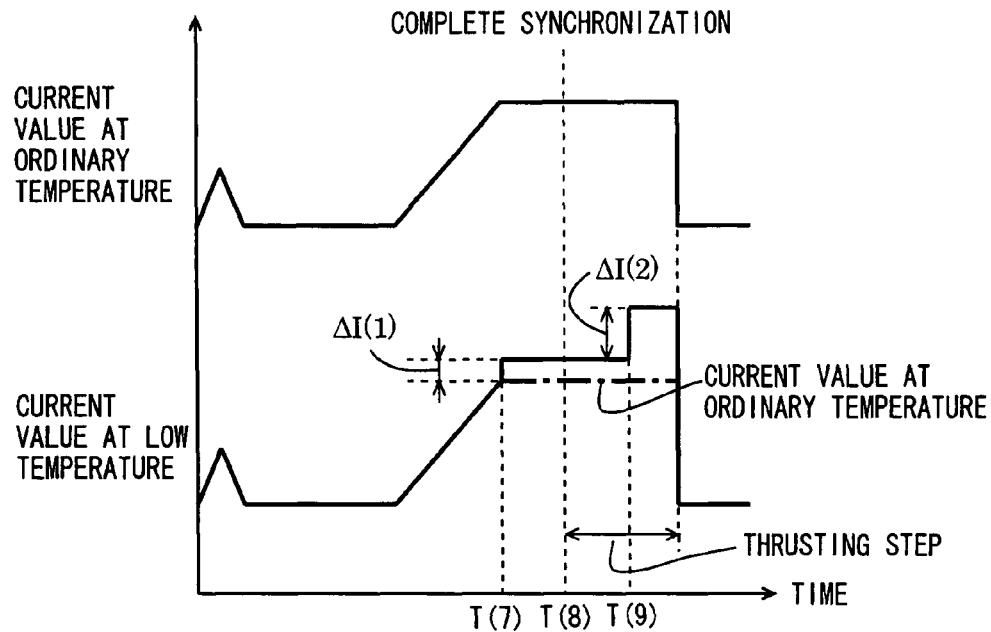
FIG. 12 is a second diagram of the current value of the actuator.

Referring to FIG. 12, at time T (7) prior to complete synchronization between rear output shaft 42 and front output shaft 44, the current value of actuator 50 is increased by only $\Delta I$ (1) in a low temperature state than in an ordinary temperature state. $\Delta I$ (1) is determined such that the pressure acting on synchronizer 122 is within a tolerable range for synchronizer 122 bringing rear output shaft 42 and front output shaft 44 in synchronization.

Subsequent to complete synchronization between rear output shaft 42 and front output shaft 44 achieved at time T (8), the current value of actuator 50 is set higher by $\Delta I$ (2) in a low temperature state than in an ordinary temperature state at time T (9). $\Delta I$ (2) is larger than $\Delta I$ (1).

Figure 13:
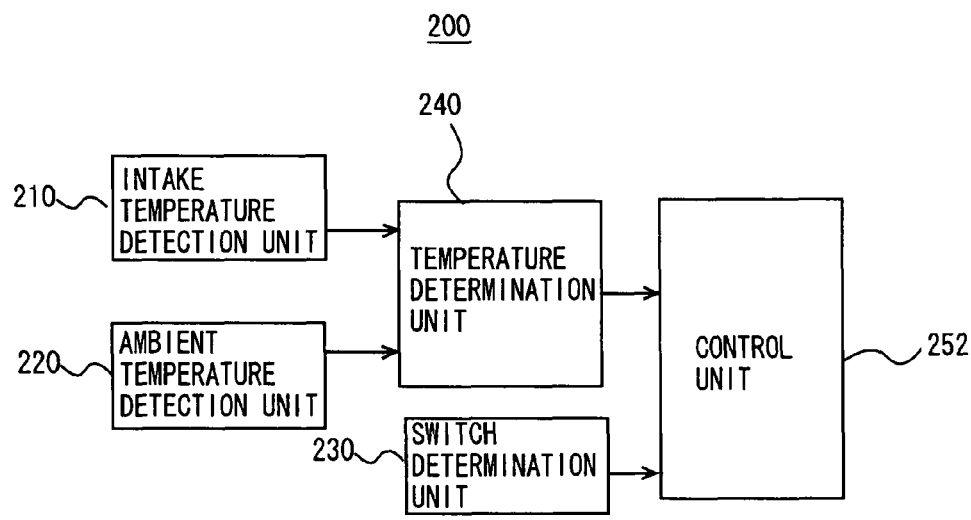
FIG. 13 is a second functional block diagram of the ECU.

ECU 200 will be described further with reference to FIG. 13. The function of ECU 200 described hereinafter may be implemented by software or hardware.

In the present embodiment, control unit 252 controls the current value of actuator 50 such that the current value is higher when in a low temperature state than when in an ordinary temperature state by increasing the current value by only $\Delta I$ (1) before complete synchronization is established between rear output shaft 42 and front output shaft 44, and by only $\Delta I$ (2) after complete synchronization has been established.

Figure 14:
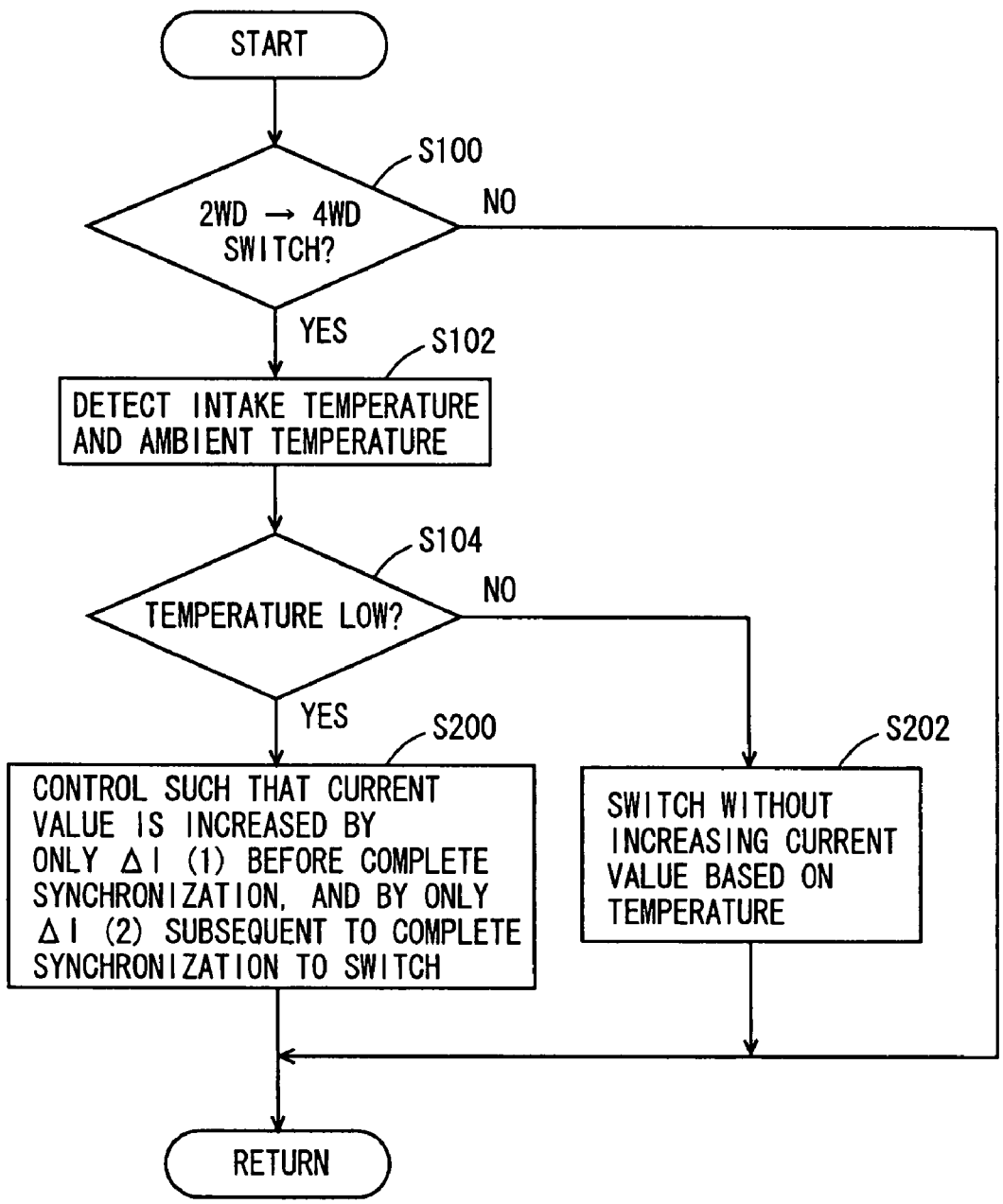
FIG. 14 is a second flowchart of a control configuration of the program executed by the ECU.

Referring to FIG. 14, a control configuration of the program executed by ECU 200 qualified as the control apparatus of the present embodiment will be described hereinafter. The program set forth below is repeatedly executed in a predetermined cycle. Steps similar to those of the first embodiment set forth above have the same step number allotted. Therefore, details of the description will not be repeated.

At S200, ECU 200 controls actuator 50 such that the current value is increased by only ΔI (1) prior to complete synchronization between rear output shaft 42 and front output shaft 44 and by only ΔI (2) subsequent to complete synchronization to switch from the two-wheel drive state to the four-wheel drive state.

At S202, ECU 200 switches from the two-wheel drive state to the four-wheel drive state without increasing the current value corresponding to the temperature. Advantages similar to those of the first embodiment can be offered by the configuration set forth above.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control apparatus for a torque transmission mechanism including a first rotational shaft transmitting torque to a first wheel, a second rotational shaft transmitting torque to a second wheel, a movable member moved by an actuator for achieving one of a state where said first rotational shaft and said second rotational shaft are connected and a state where said first rotational shaft and said second rotational shaft are disconnected, and a synchronizer member synchronizing said first rotational shaft and said second rotational shaft by abutting against said movable member before said movable member connects said first rotational shaft and said second rotational shaft, said control apparatus comprising:

a sensor detecting a value related to torque acting on said second rotational shaft, and a control unit, wherein said control unit effects control such that an output of said actuator is increased when the torque acting on the second rotational shaft is high as compared to a case where said torque is low by increasing the output of said actuator subsequent to complete synchronization between said first rotational shaft and said second rotational shaft through said synchronizer member.

2. The control apparatus for a torque transmission mechanism according to claim 1, wherein said value related to torque includes temperature, said control unit effects control such that the output of said actuator is increased when a detected temperature is lower than a threshold value as compared to a case where the detected temperature is high to increase output of said actuator in the case where the torque acting on said second rotational shaft is high as compared to the case where said torque is low.

3. A control apparatus for a torque transmission mechanism including a first rotational shaft transmitting torque to a first wheel, a second rotational shaft transmitting torque to a second wheel, a movable member moved by an actuator for achieving one of a state where said first rotational shaft and said second rotational shaft are connected and a state where said first rotational shaft and said second rotational shaft are disconnected, and a synchronizer member synchronizing said first rotational shaft and said second rotational shaft by abutting against said movable member before said movable member connects said first rotational shaft and said second rotational shaft, said control apparatus comprising:

a sensor detecting a value related to torque acting on said second rotational shaft, and a control unit, wherein said control unit effects control such that an output of said actuator is increased when the torque acting on said second rotational shaft is high as compared to a case where said torque is low by increasing the output of said actuator by a first value before complete synchronization between said first rotational shaft and said second rotational shaft is established through said synchronizer member, and by a second value larger than said first value subsequent to complete synchronization between said first rotational shaft and said second rotational shaft.

4. The control apparatus for a torque transmission mechanism according to claim 3, wherein said value related to torque includes temperature, said control unit effects control such that the output of said actuator is increased when a detected temperature is lower than a threshold value as compared to a case where the detected temperature is high to increase output of said actuator in the case where the torque acting on said second rotational shaft is high as compared to the case where said torque is low.

5. A control apparatus for a torque transmission mechanism including a first rotational shaft transmitting torque to a first wheel, a second rotational shaft transmitting torque to a second wheel, a movable member moved by an actuator for achieving one of a state where said first rotational shaft and said second rotational shaft are connected and a state where said first rotational shaft and said second rotational shaft are disconnected, and a synchronizer member synchronizing said first rotational shaft and said second rotational shaft by abutting against said movable member before said movable member connects said first rotational shaft and said second rotational shaft, said control apparatus comprising:

means for detecting a value related to torque acting on said second rotational shaft, and control means for effecting control such that an output of said actuator is increased when the torque acting on the second rotational shaft is high as compared to a case where said torque is low by increasing the output of said actuator subsequent to complete synchronization between said first rotational shaft and said second rotational shaft through said synchronizer member.

6. The control apparatus for a torque transmission mechanism according to claim 5, wherein said value related to torque includes temperature, said control means includes means for effecting control such that the output of said actuator is increased when a detected temperature is lower than a threshold value as compared to a case where the detected temperature is high to increase output of said actuator in the case where the torque acting on said second rotational shaft is high as compared to the case where said torque is low.

7. A control apparatus for a torque transmission mechanism including a first rotational shaft transmitting torque to a first wheel, a second rotational shaft transmitting torque to a second wheel, a movable member moved by an actuator for achieving one of a state where said first rotational shaft and said second rotational shaft are connected and a state where said first rotational shaft and said second rotational shaft are disconnected, and a synchronizer member synchronizing said first rotational shaft and said second rotational shaft by abutting against said movable member before said movable member connects said first rotational shaft and said second rotational shaft, said control apparatus comprising:

means for detecting a value related to torque acting on said second rotational shaft, and control means for effecting control such that an output of said actuator is increased when the torque acting on said second rotational shaft is high as compared to a case where said torque is low by increasing the output of said actuator by a first value before complete synchronization between said first rotational shaft and said second rotational shaft is established through said synchronizer member, and by a second value larger than said first value subsequent to complete synchronization between said first rotational shaft and said second rotational shaft.

8. The control apparatus for a torque transmission mechanism according to claim 7, wherein said value related to torque includes temperature, said control means includes means for effecting control such that the output of said actuator is increased when a detected temperature is lower than a threshold value as compared to a case where the detected temperature is high to increase output of said actuator in the case where the torque acting on said second rotational shaft is high as compared to the case where said torque is low.

9. A control method for a torque transmission mechanism including a first rotational shaft transmitting torque to a first wheel, a second rotational shaft transmitting torque to a second wheel, a movable member moved by an actuator for achieving one of a state where said first rotational shaft and said second rotational shaft are connected and a state where said first rotational shaft and said second rotational shaft are disconnected, and a synchronizer member synchronizing said first rotational shaft and said second rotational shaft by abutting against said movable member before said movable member connects said first rotational shaft and said second rotational shaft, said control method comprising the steps of:

detecting a value related to torque acting on said second rotational shaft, and effecting control such that an output of said actuator is increased when the torque acting on said second rotational shaft is high as compared to a case where said torque is low by increasing the output of said actuator subsequent to complete synchronization between said first rotational shaft and said second rotational shaft through said synchronizer member.

10. The control method for a torque transmission mechanism according to claim 9, wherein said value related to torque includes temperature, said step of effecting control such that an output of said actuator is increased includes the step of effecting control such that the output of said actuator is increased when a detected temperature is lower than a threshold value as compared to a case where the detected temperature is high to increase output of said actuator in the case where the torque acting on said second rotational shaft is high as compared to the case where said torque is low.

11. A control method for a torque transmission mechanism including a first rotational shaft transmitting torque to a first wheel, a second rotational shaft transmitting torque to a second wheel, a movable member moved by an actuator for achieving one of a state where said first rotational shaft and said second rotational shaft are connected and a state where said first rotational shaft and said second rotational shaft are disconnected, and a synchronizer member synchronizing said first rotational shaft and said second rotational shaft by abutting against said movable member before said movable member connects said first rotational shaft and said second rotational shaft, said control method comprising the steps of:

detecting a value related to torque acting on said second rotational shaft, and effecting control such that an output of said actuator is increased when the torque acting on said second rotational shaft is high as compared to a case where said torque is low by increasing the output of said actuator by a first value before complete synchronization between said first rotational shaft and said second rotational shaft is established through said synchronizer member, and by a second value larger than said first value subsequent to complete synchronization between said first rotational shaft and said second rotational shaft.

12. The control method for a torque transmission mechanism according to claim 11, wherein said value related to torque includes temperature, and said step of effecting control such that an output of said actuator is increased includes the step of effecting control such that the output of said actuator is increased when a detected temperature is lower than a threshold value as compared to a case where the detected temperature is high to increase output of said actuator in the case where the torque acting on said second rotational shaft is high as compared to the case where said torque is low.

* * * * *